ID 350-96.19
E197Y    XR    4,068,121

United States Patent
Bringhurst et al.

4,068,121
Jan. 10, 1978

[54] LIGHT COLLECTOR AND PRISM LIGHT SOURCE FOR PHOTOELECTRIC READERS

[75] Inventors: Edward D. Bringhurst, Seattle; John L. Marshall, Renton, both of Wash.

[73] Assignee: Tally Corporation, Kent, Wash.

[21] Appl. No.: 686,881

[22] Filed: May 17, 1976

[51] Int. Cl.$^2$ .............................................. G02B 5/14
[52] U.S. Cl. ................................. 250/227; 350/96 R; 350/96 WG
[58] Field of Search ........ 250/227; 350/96 R, 96 WG

[56] References Cited
U.S. PATENT DOCUMENTS

| 2,946,253 | 7/1960 | Clark, Jr. ........................... 350/96 R |
| 3,731,107 | 5/1973 | Goodwin et al. ..................... 250/227 |
| 3,860,814 | 1/1975 | Klang et al. ......................... 250/227 |

*Primary Examiner*—Alfred E. Smith
*Assistant Examiner*—David K. Moore
*Attorney, Agent, or Firm*—Christensen, O'Connor, Garrison & Havelka

[57] ABSTRACT

A light collector and prism that collects light from a single bulb and produces a narrow strip light beam is disclosed. The light collector and prism is formed of an elongate, integral piece of transparent material (plastic) and includes a light collecting section at one end and a prism section at the other end. Light rays emitted from a small bulb positioned in an aperture in the light collecting section are collected, to some extent (e.g., imperfectly) collimated, and directed into the prism section. The prism section extends outwardly from the collector section so as to receive the light rays collected, collimated and directed by the collecting section. The prism section includes a plurality of prism surfaces located along one edge thereof. Light rays directed by the light collecting section toward the prism section are reflected by the prism surfaces toward an opposing, narrow, light emitting edge of the prism section. Light rays emitted from the narrow edge form a narrow strip light beam. Preferably, all of the surfaces of the light collector and prism are metalized, except for the aperture within which the light source is mounted and, the narrow edge of the prism through which the narrow strip light beam is emitted.

32 Claims, 6 Drawing Figures

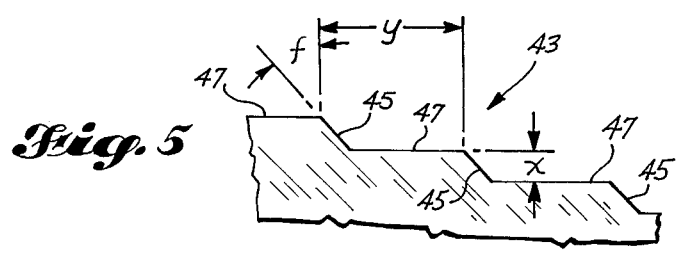
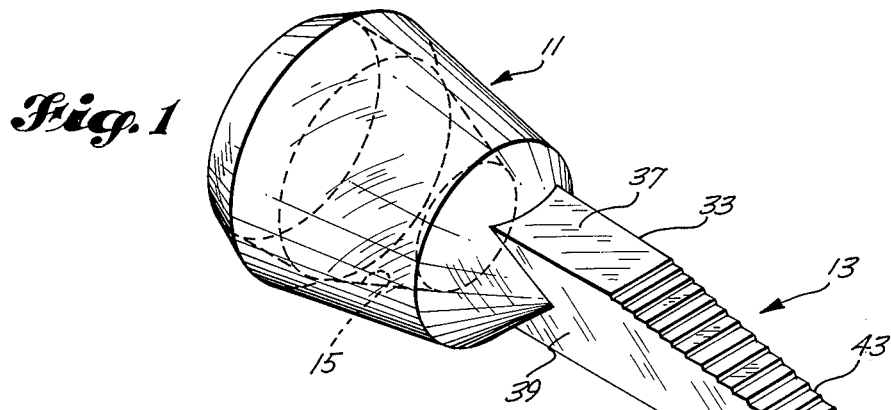
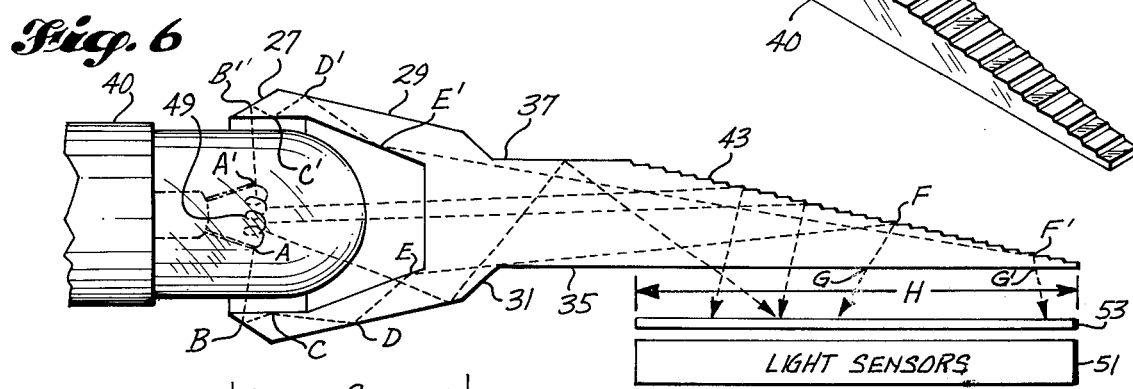
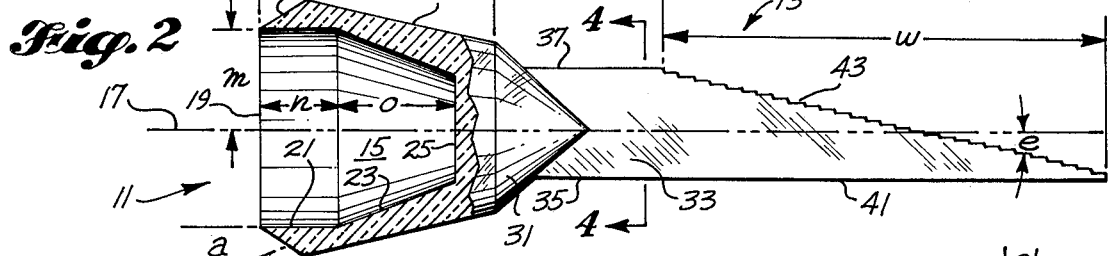
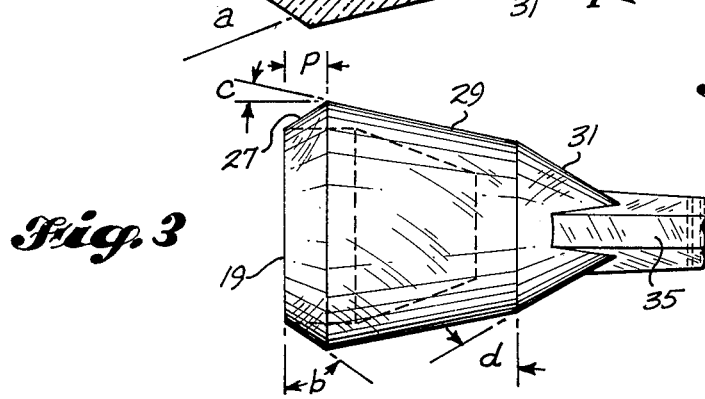
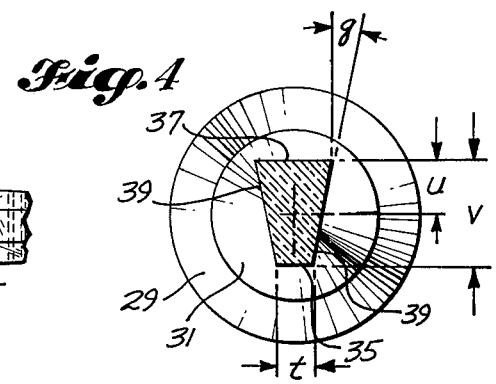

LIGHT COLLECTOR AND PRISM LIGHT SOURCE FOR PHOTOELECTRIC READERS

BACKGROUND OF THE INVENTION

This invention is directed to light collecting and directing devices and, more particularly, to light collecting and directing devices suitable for use in photoelectric readers.

As will be readily understood by those familiar with the data processing arts, photoelectric readers are devices for "reading" the presence or absence of holes in an information medium, such as a punched tape or a punched card. As the tape or card is moved through the photoelectric reader, the presence or absence of holes are detected by directing a light beam or beams toward the tape or card, preferably along an axis lying orthogonal to the direction of movement of the tape or card. Light passed by the apertures is sensed by a plurality of light sensors mounted on the side of the tape or card remote from the light receiving side.

Photoelectric readers of the type generally described above have been utilized to read punched tapes and cards in various types of information processing systems. In addition, they have been utilized in various types of control systems such as N/C control systems and in vertical format units (VFUs), used to control the movement of print forms through a printer. That is, VFUs are used to control the vertical location of print on forms so that the information to be displayed is automatically printed at the appropriate locations on the forms. Normally, a tape is punched with a program that corresponds to the particular form to be used, or more than one program is punched on a tape and used in conjunction with a plurality of forms. In any event, since the VFU tape program controls the movement of the form through the printer, it controls the vertical location of print on the form.

In the past, various types of light sources have been used and proposed for use in photoelectric readers. They have included complex arrays of mirrors and prisms, line filament lamps, and light pipes, for examples. While light sources of the type proposed by the prior art have been generally satisfactory in many environments, they have certain disadvantages making them unsuitable for use in other environments. In this regard, they have been found unsuitable for use in photoelectric readers having a very limited amount of physical space within which the light source can be mounted, particularly those wherein cost is a primary factor. That is, many prior art photoelectric light sources are unsuitable for use in photoelectric readers where physical space is very limited. Those suitable for use under such conditions are more expensive than desirable.

Therefore, it is an object of this invention to provide a new and improved inexpensive light source suitable for use in a photoelectric reader.

It is a further object of this invention to provide a new and improved light source for producing a narrow strip light beam.

It is a still further object of this invention to provide an inexpensive, small light source suitable for use in a photoelectric reader to provide a narrow strip light beam.

It is yet another object of this invention to provide an improved photoelectric reader including an inexpensive, small light source adapted to produce a narrow strip light beam.

SUMMARY OF THE INVENTION

In accordance with principles of this invention a light source, comprising a light bulb or other point light emitting element and a collector and prism, suitable for use in a photoelectric reader to produce a narrow strip light beam, is provided. (A narrow strip light beam is one that, when imaged on a planar surface, creates a narrow strip of light). The light collector and prism of the invention is formed of an elongate, integral piece of transparent material (e.g., plastic) and includes a light collector section formed at one end and a prism section formed at the other end. The light collector section includes an aperture within which the light bulb is positioned. The light collector section is formed such that light rays emitted by the bulb are collected, to some extent collimated, and directed toward the prism section. The prism section includes a stepped edge and an opposing, relatively narrow, planar edge. The "risers" and "treads" of the stepped edges form prism surfaces. Light rays received from the light collector section impinge on the stepped edge, and the prism surfaces direct the light rays toward the narrow edge from whence they are emitted as a narrow strip light beam.

In accordance with further principles of this invention, all of the surfaces of the light collector and prism are metalized, i.e., coated with a reflective metal coating, except for the aperture within which the bulb is positioned and the planar, relatively narrow, edge of the prism section.

In accordance with other principles of this invention, the aperture within which the bulb is positioned is open at one end. Starting from the open end, the first portion of the aperture is cylindrical in shape. The cylindrical portion is followed by an inwardly diverging truncated cone portion. The end of the truncated cone portion is either flat or slightly concave or convex and acts as a collimating lens.

In accordance with still further principles of this invention, the outer surface of the collecting section, starting at the end wherein the aperture opening lies, includes a first portion that diverges outwardly in the shape of a truncated cone. The outer surface then diverges inwardly in the shape of an inwardly diverging truncated cone. The inwardly diverging truncated cone may be followed by a further cone that terminates at a bar-shaped portion. The bar-shaped portion includes opposing edges that are planar and parallel to one another. One of the edges is narrower than the other end and, thus, the sides connecting the edges diverge outwardly from the narrower edge toward the larger edge.

In accordance with yet further principles of this invention the prism section extends outwardly, generally axially, from the bar-shaped portion of the light collection section such that the narrow edge of the prism section is coplanar with the narrow edge of the bar-shaped portion of the collection section. The stepped edge of the prism section diverges toward the outer tip of the narrow edge.

It will be appreciated from the foregoing summary that the invention provides a new and improved light source for a photoelectric reader. The light source includes a light collector and prism for collecting light rays from an inexpensive bulb and forming them into a narrow strip light beam. The light collector and prism is readily formed of any transparent material such as clear acrylic plastic. Thus, it is inexpensive to manufacture. Moreover, since it is useful with a low cost, incandescent lamp bulb, the overall system for producing the desired narrow strip light beam is inexpensive. While, preferably, the majority of the surfaces of the light collector and prism of the invention are metalized, for example, by vacuum deposition of aluminum for internal reflection, it will be appreciated by those skilled in the art and others that such metalization is not absolutely required for effective operation of the light collector and prism. Metalizing the denoted surfaces does, however, optimize the intensity of the resultant narrow strip beam, particularly if the metalized surfaces are coated with a back-up paint.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is an isometric view of a light collector and prism formed in accordance with the invention;

FIG. 2 is a cross-sectional elevational view, partially in section, of the light collector and prism illustrated in FIG. 1;

FIG. 3 is a partial plan view of the collector section of the light collector and prism of the invention taken orthogonally to the FIG. 2 view;

FIG. 4 is a cross-sectional view taken along line 4—4 of FIG. 2;

FIG. 5 is an enlarged, partial view illustrating the stepped edge of the light collector and prism illustrated in FIG. 2; and, FIG. 6 is a cross-sectional schematic diagram illustrating a photoelectric reader including a light source formed in accordance with the invention.

DESCRIPTION OF THE PREFERRED EMBODIMENT

FIG. 1 illustrates a light collector and prism formed in accordance with the invention. The light collector and prism illustrated in FIG. 1 is formed of an elongate, integral piece of transparent material, such as optical quality plastic, and comprises a light collecting section 11 located on one end and a prism section 13 located on the other end. In the illustrated embodiments of the invention, the light collecting section is illustrated on the left side of the Figures and the prism section is illustrated on the right side. As will be better understood from the following discussion, the light collecting section 11 includes an aperture 15 within which a low cost incandescent bulb, or other suitable point source light emitting device, is to be positioned. The majority of the light rays emitted by the bulb either pass axially out of the light collector section and into the prism, or are reflected by various surfaces of the collecting section so as to be directed toward the prism section. Thus, the majority of the light emitted by the bulb is directed into the prism section. The light rays entering the prism section 13 are redirected by the prism section in a manner such that a narrow strip light beam is formed.

FIGS. 2–5 illustrate in more detail the form and nature of both the light collector and prism sections of the light collector and prism of the invention. As noted above, the light collector and prism is elongated and, thus, has a central longitudinal axis 17. For purposes of discussion, the central longitudinal axis will be utilized as a reference point. The aperture 15 within which the bulb is positioned includes an opening 19. Extending into the light collector from the opening 19, the aperture first includes a cylindrical region defined by a cylindrical wall 21. The cylindrical region coaxially (which may be tapered slightly to provide for ease of removal from a mold) surrounds the central longitudinal axis 17 and has a radius $m$. The cylindrical region is equal to $n$ in length. Extending further into the light collection section from the inner end of the cylindrical region the aperture next includes an inwardly diverging truncated cone-shaped region defined by a truncated cone-shaped wall 23 coaxial about the longitudinal axis 17. The truncated end of the cone terminates in a wall 25 that is either flat or, if desired, slightly convex or concave. The cone-shaped wall 23 of the aperture 15 defines an angle $a$ with respect to the longitudinal axis 17 and is equal in length to $o$.

The outer surface of the light collector section, starting from the end wherein the aperture opening 19 lies includes an outwardly diverging, truncated cone-shaped wall 27 coaxially located about the longitudinal axis 17. The outwardly diverging, truncated cone-shaped wall starts at the edge of the aperture 19, defines an angle $b$ with respect to a plane lying orthogonal to the longitudinal axis 17 and has a length equal to $p$. The outwardly diverging, truncated cone-shaped wall 27 is followed by a first inwardly diverging, truncated cone-shaped wall 29. The first inwardly diverging, truncated cone-shaped wall 29 forms an angle $c$ with respect to the central longitudinal axis 17 and is equal in length to $q$ minus $p$. The first inwardly diverging, truncated cone-shaped wall 29 is followed by a second inwardly diverging, generally cone-shaped wall 31. The second inwardly diverging cone-shaped wall 31 forms an approximate angle $d$ with respect to a plane lying orthogonal to the longitudinal axis 17 and terminates where it meets a bar 33 coaxially located about the central longitudinal axis 17.

The bar 33, as best seen in FIG. 4, includes a narrow edge 35 and a wide edge 37. The narrow and wide edges are parallel to one another and are connected together by a pair of diverging sides 39. The overall length of the light collector section 11 along the longitudinal axis 17, starting at the end wherein the aperture 19 lies and extending to the outer end of the bar 33 is equal to $q$ plus $r$. The width of the wide edge is equal to $t$ and the diverging sides form an angle $g$ with respect to a line orthogonal to the parallel narrow and wide edges 35 and 37. Further, the distance between the central longitudinal axis 17 and the wide edge equals $u$ and the distance between the narrow and wide edges equals $v$.

It should be noted that the truncated cone-shaped wall 23 of the aperture 15 and the first inwardly diverging, truncated cone-shaped wall of the outer surface of the light collector section diverge with respect to one another. This divergence tends to direct light rays in the divergence direction. As will be appreciated by those skilled in the art converging in this area would, in an extreme case, cause light rays to reverse direction. The benefit of this arrangement will be better understood from the hereinafter discussion of the operation of the light collector and prism of the invention.

The prism section 13 extends generally axially outwardly from the bar region 33 of the light collector section 11 along the longitudinal axis 17. The prism section 13 is elongate and includes a narrow edge 41 lying coplanar with the narrow edge 35 of the bar section 33. The prism section 13 also includes a stepped edge 43. The stepped edge 43 diverges toward the outer tip of the narrow edge 41 of the prism section 13, from the end of the wide edge 37 of the bar region 33. The average "slope" of the stepped edge 43 defines an average angle e with respect to the longitudinal axis 17. The end result of this structure is that the stepped edge 43 diverges toward the narrow edge and the narrow edge 41 lies parallel to the longitudinal axis 17. The stepped edge 43 is slightly larger in width than the narrow edge 41. Thus, the sides 42 connecting the narrow edge 41 and the stepped edge 43 diverge outwardly with respect to the narrow edge 41. These sides 42 are coplanar with the sides 29 of the bar region 33 of the collection section 11. The prism section 13 is equal in length to w.

As best illustrated in FIG. 5, the stepped edge 43 comprises a plurality of steps. Each step includes a "riser" section 45 and a "tread" section 47. The tread sections lie parallel to the longitudinal axis 17. The riser sections 45 extend between the tread sections 47 and define an angle f with respect to a plane or line lying orthogonal to the longitudinal axis 17. The vertical distance, i.e., the distance along a line orthogonal to the longitudinal axis 17, between the "treads" 47 is equal to x. The total distance parallel to the longitudinal axis covered by a single "step" is equal to y.

By way of example of a specific embodiment of the invention, the various angles and dimensions denoted above are set forth in the following tables:

Table I

| | Angles |
|---|---|
| a | 20° 30' ± 30' |
| b | 60° ± 30' |
| c | 12° ± 30' |
| d | 60° |
| e | 12° |
| f | 45° |
| g | 12° |

Table II

| | Distance Dimensions |
|---|---|
| m | .33" |
| n | .24" |
| o | .41" |
| p | .138 ± .010" |
| q | .77" |
| r | .573" |
| t | .093" |
| u | .160" |
| v | .350 ± .004" |
| w | 1.489 ± .005" |
| x | .0106 ± .0020" |
| y | .050" |

FIG. 6 illustrates in schematic form the operation of the invention. FIG. 6 illustrates an incandescent lamp bulb 40 positioned in the aperture 15 such that its filament 49 lies substantially in the center of the cylindrical wall 21 region. When in this position, light rays emitted by the filament in a sphere covering an arc of slightly greater than 180 degrees are collected. (This imaginary semispherical region has its nominal center located at the filament 49 and its limiting wall defined by a cone starting at this center and diverging toward the peripheral edge of the aperture opening 19). All of the light rays emitted by the filament in this semispherical region are collected by the collector section 11. Only light emitted outside of this region i.e., generally toward the base of the lamp bulb, or, more precisely in the direction covered by the cone defining the limiting wall of the semispherical region are not collected.

FIG. 6 illustrates, by way of example, five collected light ray paths, only the most complex of which is described. This light ray path starts at the filament, point A, diverges slightly toward the base of the lamp 14, yet stays within the aperture 15, passes through a cylindrical wall 21 of the aperture 15 and intersects the outwardly diverging, truncated cone-shaped wall 27 at point B. The light ray is reflected by the outwardly diverging, truncated cone-shaped wall 27 at points B and intersects the cylindrical wall 21 of the aperture 15 at point C. The light is reflected by the cylindrical wall 15 and next intersects the first inwardly diverging, truncated cone-shaped outer wall 29 at point D. The light ray is reflected by this wall toward the inwardly diverging cone-shaped wall 23 of the aperture 15 and intersects that wall at point E. The light ray is redirected by the inwardly diverging cone-shaped wall 23 of the aperture into the prism section 13.

In the prism section 13, the light ray intersects one of the risers 45 of the stepped edge 43, at point F, and is redirected by the riser to the narrow edge 41, where it exits at point G.

A similar light ray is illustrated in the upper portion of FIG. 4, with "prime" letters being used to denote related points. The other three light ray paths illustrated in FIG. 4 either pass directly outwardly through the terminating wall 25 of the aperture and directly enter the prism section 13, or follow less complicated paths than the one described above. These rays also intersect risers of the stepped edge 43 of the prism section and are directed through the narrow edge 41.

In the foregoing manner, light rays are collected by the collecting section, to some degree collimated and, then, directed toward the prism section. Most of the light rays entering the prism section impinge directly on the stepped edge and are redirected so as to exit via the narrow edge 41. Light rays intersecting the sides 40 of the prism section are redirected by the sides, either directly or indirectly, toward the steps of the stepped edge 43 and, then, by the stepped edge 43 out the narrow edge 41. In this manner, a narrow strip light beam of width H is created. As illustrated, the light beam is not a perfectly collimated beam; however it contains adequate intensity for its intended use over distance H.

FIG. 6 also illustrates the narrow strip light beam positioned in a photoelectric reader such that it is intersected by a row of light sensors 51. Also illustrated in FIG. 6 is punched tape or apertured card 53. The punched tape or apertured card 53 moves in a direction into the plane of FIG. 6 and through the narrow strip light beam. As the punched tape or apertured card moves in the foregoing direction, the holes therein control the receipt of light by the light sensors 51 in a conventional manner.

In its preferred form, the light collector and prism is formed of clear plastic, such as clear acrylic. Further, all of the surfaces of the light collector and prism are metalized surfaces except for the narrow edge 41 of the prism section 13 and the surfaces of the aperture 15. Metalization may be accomplished by vacuum depositing aluminum for internal reflection, for example. Preferably, the aluminum is backed up with a suitably colored coating, such as a white coating.

It will be appreciated from the foregoing description that the invention comprises a new and improved light source suitable for use in a photoelectric reader. The light source generally comprises a light collector and prism useful in combination wit a low cost incandescent bulb. The light collector and prism includes a light collector section adapted to collect and redirect light in a generally collimated fashion toward the prism section. The prism section redirects the light by approximately 90°, into a narrow strip light beam. While not a perfectly collimated narrow strip light beam, the beam has an intensity adequate for use in a photoelectric reader environment.

While a preferred embodiment of the invention has been illustrated and described, it will be appreciated by those skilled in the art and others that various changes can be made therein without departing from the spirit and scope of the invention. For example, a light source other than a filament type incandescent bulb can be utilized if desired. In addition, while preferred, various angles and dimensions other than those specifically set forth in Table I and Table II can be utilized if desired. For example, angle $f$ can be other than 45° if it is desired that the prism section redirect light by some angle other than approximately 90°. Hence, the invention can be practiced otherwise than as specifically described.

The embodiments of the invention in which an exclusive property or privilege is claimed are defined as follows:

1. In a photoelectric reader including a light source, mounted such that light rays are directed toward a region whereat an apertured information medium is positioned or passes, and light sensors, located on the side of the apertured information medium remote from the light receiving side, for receiving light passing through the apertures in the apertured information medium, the improvement comprising a light source for producing a continuous, narrow strip light beam, said light source including:

A. an elongate, integral light collector and prism having a central longitudinal axis, comprising:
      1. a cone shaped collector section formed at one end of said light collector and prism, said collector section including an aperture located along said central longitudinal axis suitable for receiving a point source light emitting element, the internal surfaces of said aperture and the external surfaces of said light collector section being formed so as to collect light rays emitted by a point source light emitting element positioned in said aperture, imperfectly collimate said light rays and direct said imperfectly collimated light rays in a predetermined direction generally, but not entirely, parallel to said central longitudinal axis of said light collector and prism; and,
      2. a prism section formed at the other end of said elongate, integral light collector and prism, said prism section being positioned along said central longitudinal axis so as to receive said imperfectly collimated light rays directed in a direction generally, but not entirely, parallel to said central longitudinal axis of said light collector and prism by said collector section, said prism section being elongated and including opposed stepped and narrow edges, said stepped edge including tread regions lying parallel to said central longitudinal axis and riser regions lying transverse to said central longitudinal axis, said riser regions positioned so as to receive light rays directed in a direction parallel to said central axis by said collector section and redirect said light rays outwardly through said narrow edge, said tread regions positioned so as to receive light rays directed in a direction not entirely parallel to said central longitudinal axis by said collector section and redirect said light rays outwardly through said narrow edge; and, B. a point source light emitting element mounted in said aperture in said collector section of said elongate, integral light collector and prism.

2. The improvement claimed in claim 1, wherein the outer wall of said collector section and the wall of said aperture both include cone-shaped sections co-axially formed about, and diverging in the same direction toward, said central longitudinal axis, the cone-shaped section of said aperture wall diverging more rapidly toward said longitudinal axis than the cone-shaped section of said outer wall of said collector section; and wherein said point light source light emitting element is an incandescent bulb.

3. The improvement claimed in claim 2 wherein said elongate, integral light collector and prism is formed of transparent acrylic plastic.

4. The improvement claimed in claim 3 wherein all of the surfaces of said elongate, integral light collector and prism are metalized except for the surfaces of said aperture in said collector section and the narrow edge of said prism section.

5. The improvement claimed in claim 2 wherein: said aperture of said collector section also includes a cylindrical section, having an exterior opening, forming co-axially about said central longitudinal axis; the cone-shaped section of said aperture is truncated and diverges inwardly from said cylindrical section; and, said cone-shaped section of said aperture terminates in a collimating lens surface.

6. The improvement claimed in claim 5 wherein, starting at the end of said collector section containing the exterior opening into said aperture, the outer wall of said collector section commences with an outwardly diverging cone-shaped section formed co-axially about said central longitudinal axis followed by said outer wall inwardly diverging cone-shaped section.

7. The improvement claimed in claim 6 wherein said elongate, integral light collector and prism is formed of transparent acrylic plastic.

8. The improvement claimed in claim 7 wherein all of the surfaces of said elongate, integral light collector and prism are metalized except for the surfaces of said aperature in said collector section and the narrow edge of said prism section.

9. The improvement claimed in claim 6 wherein said stepped edge of said prism section converges toward the narrow edge of said prism section and the narrow edge of said prism section is planar and lies parallel to said central longitudinal axis of said elongate, integral light collector and prism.

10. The improvement claimed in claim 9, wherein the risers of the steps of said stepped edge form an angle of approximately 45° with respect to said central longitudinal axis.

11. The improvement claimed in claim 10 wherein said elongate, integral light collector and prism is formed of transparent acrylic plastic.

12. The improvement claimed in claim 11 wherein all of the surfaces of said elongate, integral light collector and prism are metalized except for the surfaces of said aperture in said collector section and the narrow edge of said prism section.

13. The improvement claimed in claim 1 wherein said stepped edge of said prism section converges toward the narrow edge of said prism section and the narrow edge of said prism section is planar and lies parallel to said central longitudinal axis of said elongate, integral light collector and prism.

14. The improvement claimed in claim 13, wherein the risers of the steps of said stepped edge form an angle of approximately 45° with respect to said central longitudinal axis.

15. The improvement claimed in claim 1 wherein said elongate, integral light collector and prism is formed of transparent acrylic plastic.

16. The improvement claimed in claim 15 wherein all of the surfaces of said elongate, integral light collector and prism are metalized except for the surfaces of said aperture in said collector section and the narrow edge of said prism section.

17. A light collector and prism comprising:
1. a cone shaped collector section including an aperture located along a central longitudinal axis suitable for receiving a point source light emitting element, the internal surfaces of said aperture and the external surfaces of said light collector section being formed so as to collect light rays emitted by a point source light emitting element positioned in said aperture, imperfectly collimate said light rays and direct said imperfectly collimated light rays in a predetermined direction generally, but not entirely, parallel to said central longitudinal axis; and,
2. a prism section integrally formed at the end of said collector section remote from said aperture, said prism section being positioned along said central longitudinal axis so as to receive said imperfectly collimated light rays directed in a direction generally, but not entirely, parallel to said central longitudinal axis by said collection section, said prism section being elongated and including opposed stepped and narrow edges, said stepped edge including tread regions lying parallel to said central longitudinal axis and riser regions lying transverse to said central longitudinal axis, said riser regions positioned so as to receive light rays directed in a direction parallel to said central longitudinal axis by said collector section and redirect said light rays outwardly through said narrow edge, said tread regions positioned so as to receive light rays directed in a direction not entirely parallel to said central longitudinal axis by said collector section and redirect said light rays outwardly through said narrow edge, said outwardly redirected light rays forming a continuous narrow strip light beam.

18. A light collector and prism as claimed in claim 17 wherein the outer wall of said collector section and the wall of said aperture both include cone-shaped sections co-axially formed about, and diverging in the same direction toward, said central longitudinal axis, the cone-shaped section of said aperture wall diverging more rapidly toward said longitudinal axis than the cone-shaped section of said outer wall of said collector section.

19. A light collector and prism as claimed in claim 18 formed of transparent acrylic plastic.

20. A light collector and prism as claimed in claim 19 wherein all of the surfaces of said light collector and prism are metalized except for the surfaces of said aperture in said collector section and the narrow edge of said prism section.

21. A light collector and prism as claimed in claim 18 wherein: said aperture of said collector section also includes a cylindrical section, having an exterior opening, formed co-axially about said central longitudinal axis; the cone-shaped section of said aperture is truncated and diverges inwardly from said cylindrical section; and, said cone-shaped section of said aperture terminates in a collimating lens surface.

22. A light collector and prism as claimed in claim 21 wherein, starting at the end of said collector section containing the exterior opening into said aperture, the outer wall of said collector section commences with an outwardly diverging cone-shaped section formed co-axially about said central longitudinal axis followed by said outer wall inwardly diverging cone-shaped section.

23. A light collector and prism as claimed in claim 22, formed of transparent acrylic plastic.

24. A light collector and prism as claimed in claim 23 wherein all of the surfaces of said light collector and prism are metalized except for the surfaces of said aperture in said collector section and the narrow edge of said prism section.

25. A light collector and prism as claimed in claim 4 wherein said stepped edge of said prism section converges toward the narrow edge of said prism section and the narrow edge of said prism section is planar and lies parallel to said central longitudinal axis.

26. A light collector and prism as claimed in claim 25, wherein the risers of the steps of said stepped edge form an angle of approximately 45° with respect to said central longitudinal axis.

27. A light collector and prism as claimed in claim 25 formed of transparent acrylic plastic.

28. A light collector and prism as claimed in claim 27 wherein all of the surfaces of said light collector and prism are metalized except for the surfaces of said aperture in said collector section and the narrow edge of said prism section.

29. A light collector and prism as claimed in claim 17 wherein said stepped edge of said prism section converges toward the narrow edge of said prism section and the narrow edge of said prism section is planar and lies parallel to said central longitudinal axis.

30. A light collector and prism as claimed in claim 29 wherein the risers of the steps of said stepped edge form an angle of approximately 45° with respect to said central longitudinal axis.

31. A light collector and prism as claimed in claim 17 wherein said elongate, integral light collector and prism is formed of transparent acrylic plastic.

32. A light collector and prism as claimed in claim 31 wherein all of the surfaces of said light collector and prism are metalized except for the surfaces of said aperture in said collector section and the narrow edge of said prism section.

* * * * *

UNITED STATES PATENT AND TRADEMARK OFFICE
CERTIFICATE OF CORRECTION

PATENT NO. : 4,068,121

DATED : January 10, 1978

INVENTOR(S) : Bringhurst et al

It is certified that error appears in the above-identified patent and that said Letters Patent are hereby corrected as shown below:

Claim 5 (Column 8) line 27, delete "forming" and insert —formed—.

Claim 17 (Column 9) line 35, delete "collection" and insert —collector—.

Claim 25 (Column 10) line 28, delete "4" and insert —24—.

Signed and Sealed this

Second Day of May 1978

[SEAL]

Attest:

RUTH C. MASON
*Attesting Officer*

LUTRELLE F. PARKER
*Acting Commissioner of Patents and Trademarks*